July 7, 1931.   W. E. HARPER   1,813,741
SEAT BURR
Filed Dec. 21, 1929
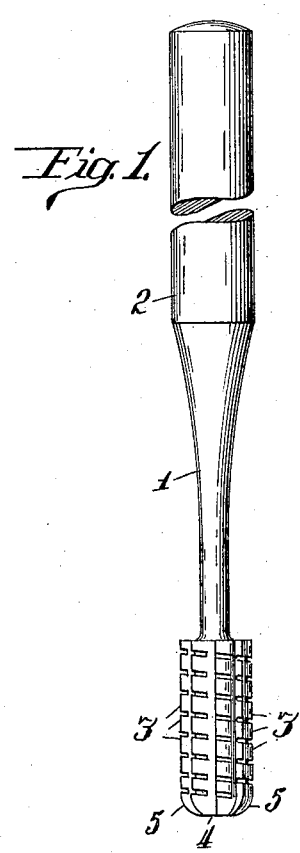
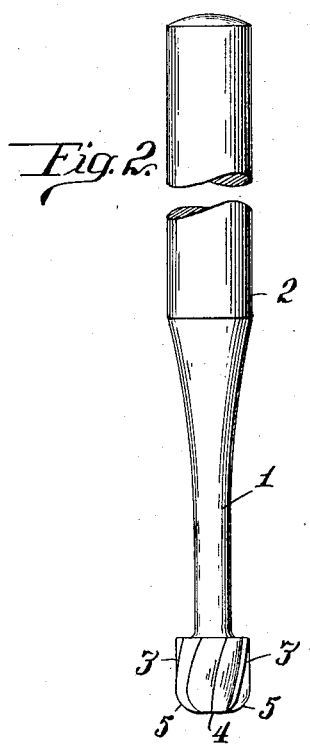
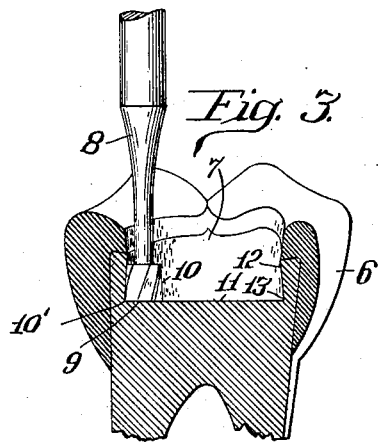
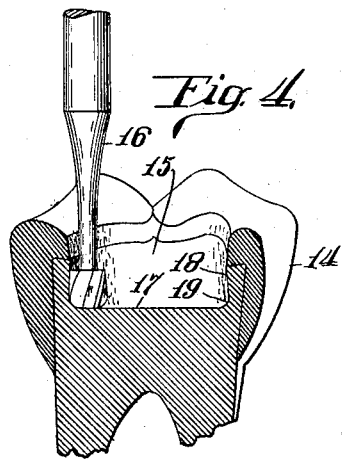
Inventor
William E. Harper
By Barnett & Truman
Attorneys Patented July 7, 1931

1,813,741

UNITED STATES PATENT OFFICE

WILLIAM E. HARPER, OF CHICAGO, ILLINOIS

SEAT BURR

Application filed December 21, 1929. Serial No. 415,763.

This invention relates to a type of dentist burr used in the preparation of a tooth cavity for filling with gold or amalgam or similar substances commonly used in filling tooth cavities, and the primary object is to provide a burr of such construction as will enable a dentist to prepare a cavity in such a way that a more efficient filling will result. By more efficient is meant a filling that will not leak air or moisture. This is most important for the following reasons. Heretofore in the art of cavity preparation it has been the practice to form a seat in the tooth with a flat bottom and perpendicular side walls. In a cavity so prepared both gold and amalgam have been used as the filling substance but for reasons hereinafter stated gold has to a great extent superseded amalgam. In a cavity prepared as described it is practically impossible to make an air tight filling, due to the definite angles formed by the flat seat and the perpendicular walls. It is most difficult to exert sufficient pressure to force the substance used in filling the tooth into these line and point angles and consequently air pockets are formed and subsequently a leak develops. If gold is used as the filling substance and a leak occurs, the tooth slowly decays and the filling is of little value. If amalgam is used in place of gold and a leak occurs, a chemical action takes place between the air, moisture and the amalgam and a powerful germicide is formed which prevents decay but unfortunately also stains the tooth, making it most unattractive. Consequently although amalgam is by far the better filling than gold, gold is generally used in its place, due to the fact that an air tight filling is so difficult to make under the method of cavity preparation above described, and with a leaky filling in which amalgam is used, the resultant staining of the tooth occurs.

In order to properly prepare a tooth cavity for an amalgam filling so that the filling will be air tight, I have discovered the proper method to be as hereinafter stated. Instead of forming a flat seat in the cavity with perpendicular side walls which form definite angles and corners as above described, the flat seat is made to terminate at its outer edges into sloping or curved walls which gradually approach and merge into the side walls. In other words the definite line and point angles formed by the preparation of a cavity having a flat seat and abrupt perpendicular walls are obviated by substituting therefor gently curved surfaces. An air tight filling can be inserted in a cavity so prepared, due to the fact that the substance used can be easily forced into contact with the whole wall of the cavity which is difficult if not impossible in a cavity having definite angles as above described.

In order to prepare such a cavity I have invented a burr which will enable the operator to properly form the cavity in one operation. The prior art does not offer an instrument capable of performing such an operation. Even though the use of burrs with flat bases and burrs of curved or spherical or cylindrical shape are old, it is difficult to prepare a cavity as I have above described, using the instruments now available.

My invention comprises a burr having a flat cutting surface at its end or base, a cylindrical side cutting surface, and a rounded or curved edge cutting surface which joins and merges with said flat end surface and cylindrical side cutting surface. Of course the side cutting surface may be either conical or cylindrical, the feature of the invention being the connecting of the flat or seat grinding surface of the burr to the side cutting surface by means of a gradually curved cutting surface so that in preparing a tooth for filling, definite angles will not be formed and if already formed will be removed.

In the drawings:

Figs. 1 and 2 are shown elevations of two burrs of different general shape and constructed in accordance with my invention herein described.

Fig. 3 is a cross sectional view of a tooth showing a cavity prepared for filling by a burr of the usual unimproved type.

Fig. 4 is a cross sectional view of a tooth showing a cavity prepared for filling by a burr constructed in accordance with my invention.

Referring more particularly to the drawings, Figs. 1 and 2, 1 is a burr, 2 is the burr shaft, 3 is the side or cylindrical cutting surface, 4 is the end or seat cutting surface, and 5 is the curved cutting surface joining the cutting surfaces 3 and 4.

In Fig. 3 is shown a tooth 6 with a cavity 7 which has been prepared for filling by the burr 8 which is a burr of the type commonly used by the dental profession and known as an inverted cone burr. This burr has a flat end cutting surface 9 and a cylindrical or conical side cutting surface 10 which joins surface 9 at a sharp edge 10′. The cavity prepared with this burr comprises a flat base 11 and converging side walls 12, there being sharp angles 13 formed between the wall and base. To fill this cavity a substance of a definite degree of plasticity is inserted and is then tamped into position so as to thoroughly fill the cavity. To fill a tooth cavity perfectly it is essential that the filling substance contacts positively with all parts of the cavity surface so that no air pockets are formed between the cavity surface and the filling. It is a recognized fact that it is most difficult to exert sufficient pressure in the tamping process to force the filling substance into the angles 13 and in a large percentage of cases this is not done and air pockets are formed in these angles.

The definite acute angles 13 can clearly be seen in Fig. 3 and the difficulty in forcing a filling in these angles so as to completely fill them and contact with all parts of the base can be readily understood. In the course of time these air pockets develop leaks which allow the outside air to come into contact with the part of the tooth supposedly protected by the filling. When this happens the usefulness of the filling is terminated unless amalgam is used as the filling substance and in which case the tooth becomes stained and unattractive as above stated.

In Fig. 4 is shown a tooth 14 having a cavity 15 which has been prepared for filling by the burr 16 similar to the one shown in Fig. 2. The cavity thus prepared comprises a flat base 17, converging side walls 18 and curved portions 19 which connect the walls 18 and the base 17. It is clearly shown that by using a burr on this improved type the definite angles 13 of Fig. 3 are avoided and in their place are formed the gentle curves 19, Fig. 4. It is a relatively simple matter for a member of the dental profession to construct a non-leaking filling in a cavity so prepared with the resultant benefits hereinabove mentioned. It should be noted that a filling inserted in a cavity of this kind is more efficient than others, due not only to the curved surfaces in place of the definite angles but also to the fact that the flat base and side walls are maintained which give the necessary support and bracing effect to the filling and which tend to hold the filling in position against the great pressure exerted upon the filling by the corresponding tooth in the opposite jaw.

I claim:

1. A dental burr of substantially cylindrical shape having a cutting surface on its sides and on one end and a curved edge cutting surface connecting said sides and end.

2. A dental burr formed with two separate cutting surfaces adapted to form two walls of a cavity substantially perpendicular to one another, said cutting surfaces being joined by a third cutting surface which is curved and merges into the first two cutting surfaces.

3. A dental burr formed with continuous cutting surfaces on its sides and end so formed that a longitudinal central section through the burr will have a flat end, straight sides and curved edges merging into the straight side and end portions.

4. A dental burr for preparing a cavity for filling comprising a flat seat forming surface on one end thereof, a side wall forming surface, said surfaces being joined together by a curved cutting surface.

5. A dental burr of substantially cylindrical shape having a straight cutting surface on one end, a straight cutting surface on its sides and above said end surface and a curved cutting surface connecting said other two cutting surfaces.

6. A dental burr of substantially cylindrical shape having a straight cutting surface on one end, a straight cutting surface on its sides and above said end surface and a non-straight cutting surface joining said other two cutting surfaces in a gentle curve.

7. A dental burr of substantially cylindrical shape having a cutting surface on its sides and above one end, a cutting surface on said end of less diameter than the burr through said other cutting surface and a curved cutting surface joining the ends of said other two cutting surfaces.

WILLIAM E. HARPER.